Aug. 15, 1950   S. JOHANSON   2,519,251
SHUTTER DISSOLVE IN SLIDE PROJECTORS

Filed Aug. 2, 1946   4 Sheets-Sheet 2

INVENTOR.
STEN JOHANSON
BY
ATTORNEY

Aug. 15, 1950     S. JOHANSON     2,519,251
SHUTTER DISSOLVE IN SLIDE PROJECTORS

Filed Aug. 2, 1946     4 Sheets-Sheet 4

*INVENTOR.*
Sten Johanson
BY
*ATTORNEY*

Patented Aug. 15, 1950

2,519,251

UNITED STATES PATENT OFFICE 2,519,251

SHUTTER DISSOLVE IN SLIDE PROJECTORS

Sten Johanson, New York, N. Y., assignor to Universal Camera Corporation, New York, N. Y., a corporation of New York Application August 2, 1946, Serial No. 687,910

12 Claims. (Cl. 88—28)

This invention relates to an improvement in the construction of slide projectors, and more specifically to a device to be embodied in a slide projector for the purpose of fading out the projected image or cutting off the light from the screen while slides are being shifted.

Ordinary projectors do not comprise any such device, so that whenever a slide is being withdrawn from, or shifted into, the proper position for projecting, the motion of the slide is clearly visible on the screen. This fact tends to interrupt the continuity of the subject being presented, distracting the spectators, and decreasing the educational or the entertainment efficacy of the presentation.

According to my invention, I embody in a slide projector a number of iris leaves constituting together a diaphragm having an aperture variable from a maximum to zero, and I associate said leaves and combine them with means operatively connected with movable portions of the slide projector, whereby they operate in suitable synchronism with said movable portions.

The general object of my invention is to provide means in a slide projector for fading out the projected image or cutting off the light from the screen while the slides are being shifted.

A more particular object is to provide means in a slide projector for cutting off the light from the screen, which means enter into operation whenever a slide is shifted outwardly of the projector away from its projecting position, and which means are automatically returned to their inoperative position, allowing full lighting of the screen, as soon as a new slide is moved into the projecting position.

Another object is to provide in a slide projector a diaphragm comprising a number of iris leaves swingable, in synchronism from a position of complete aperture to one of complete closure, and means operatively connecting said iris leaves to slide holding means, whereby the operation of said diaphragm is controlled by the motion of said slide holding means.

A further object is to provide in a slide projector slide holding means reciprocable between two extreme positions in each of which one slide is in position for projecting and another slide is accessible for changing, and diaphragm means operatively connected to said slide holding means in such a manner as to cut off the light from the screen when said slide holding means are displaced from either of said extreme positions and as to allow of the free passage of light to the screen when said slide holding means go into either of said extreme positions.

A still further object is to provide in a slide projector slide holding means and diaphragm means according to the preceding object, which diaphragm means operate to cut off the light from the screen when said slide holding means are about to be displaced from either of their extreme positions, before any actual displacement occurs.

A still further object is to provide means in a slide projector achieving all of the aforementioned objects, which means are simple, foolproof and can be embodied in a slide projector at a very reasonable cost.

Other related and ancillary objects of my invention will clearly appear as the description proceeds.

Figure 1:
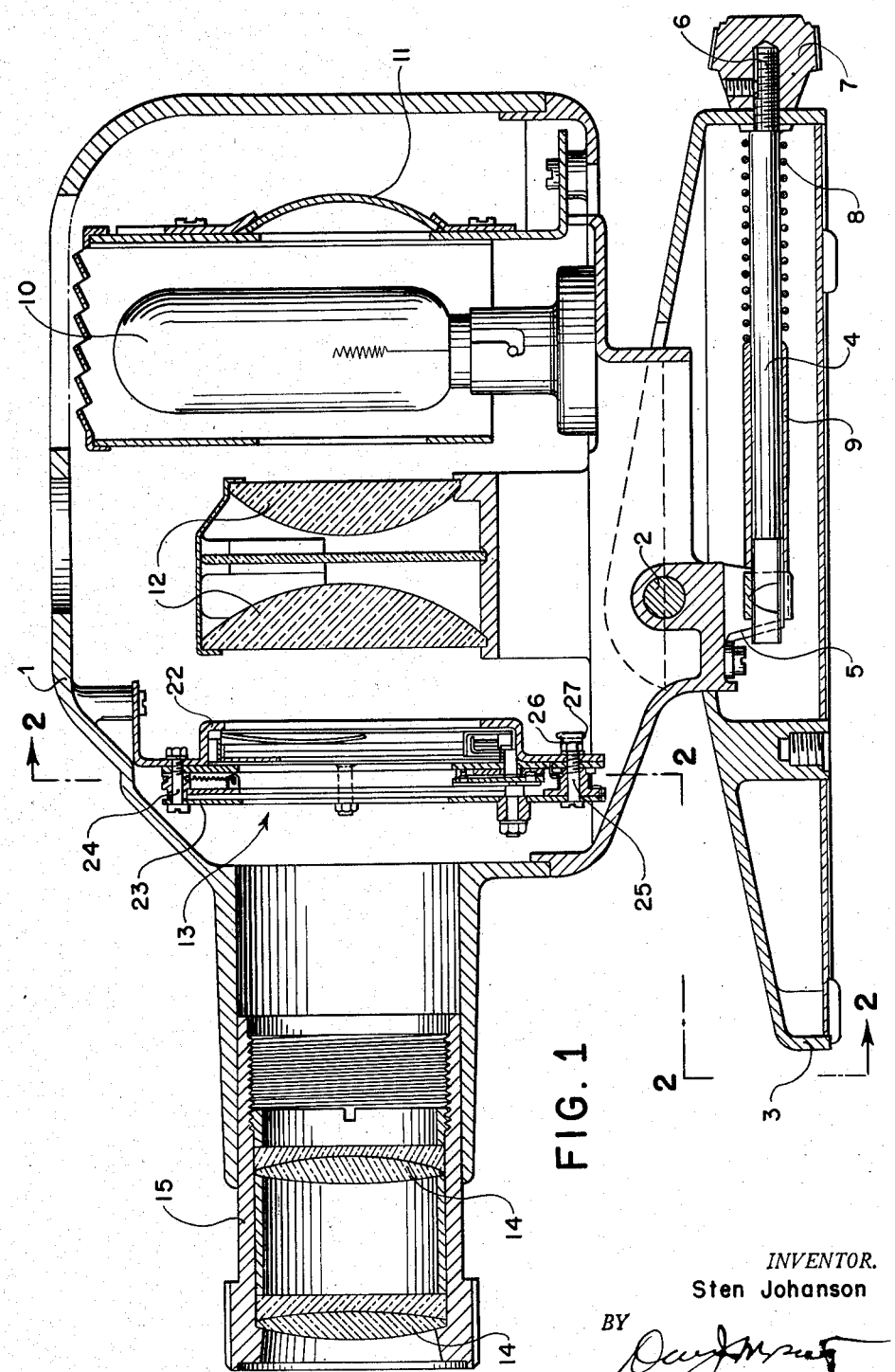
Fig. 1 is a vertical section of a slide projector embodying my invention, taken along the longitudinal axis of the projector.

Referring now in detail to the drawings, the slide projector comprises a suitable casing 1 which is pivoted at 2 to a pedestal 3. A tie 4 is attached to a projection 5 of the casing 1, and terminates with a screw threaded portion 6, engaged by a nut 7 outside the pedestal. A spring 8, held between the pedestal 3 and a sleeve 9 mounted at the tie 4 internally of the pedestal, normally urges the tie as far to the front of the projector as the nut 7 will allow it to go, so that by screwing in the nut 7, the tie can be pulled to the rear, and the projector casing 1 will slant with its forward end downwardly.

Inside the casing 1 are carried a source of light 10, a reflector 11, condensing lenses 12, a slide holder and diaphragm assembly generally designated at 13 and a group of objective lenses 14, mounted in the objective slide 15 for focusing. The slide holder and diaphragm assembly 13 is the portion of the projector with which this invention is particularly concerned and is therefore illustrated at a greater scale and in various positions in Figs. 3, 4, 5 and 6.

Figure 2:
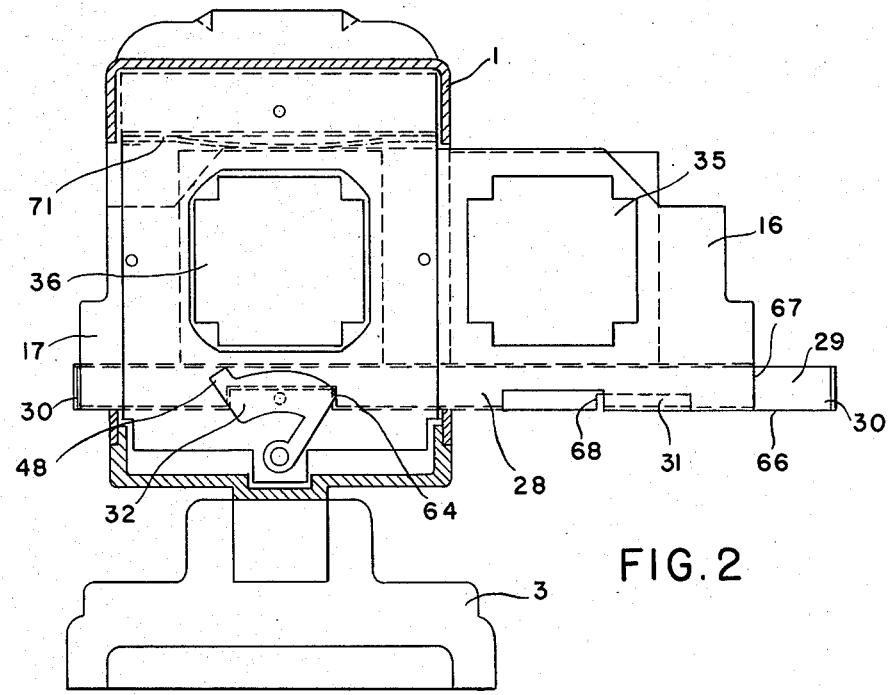
Fig. 2 is a vertical section of the projector of Fig. 1 taken on the line 2—2 looking in the direction of the arrows.
Figure 3:
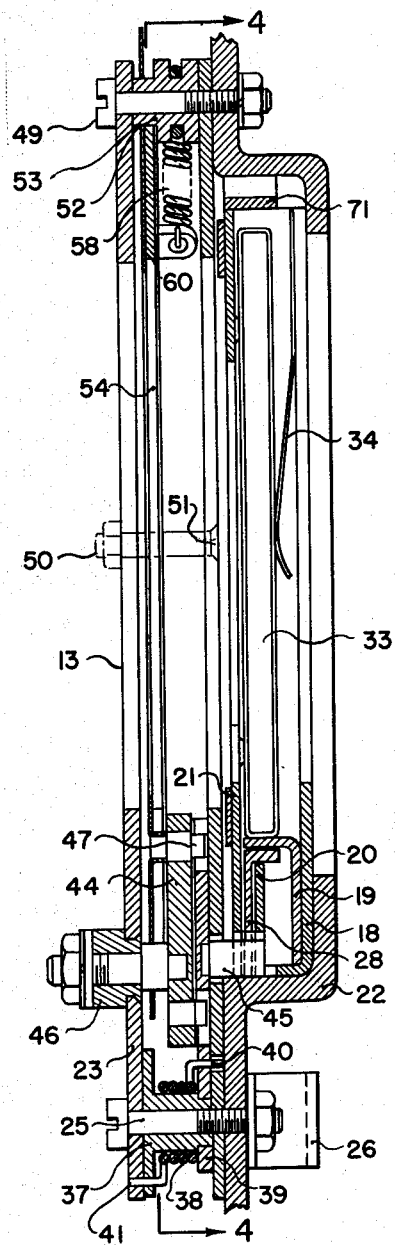
Fig. 3 is an enlargement of a detail of Fig. 1 and precisely of the slide holder and diaphragm assembly.

The said slide holder and diaphragm assembly comprises a diaphragm to be described later and a double slide holder 16—17. Said slide holder, as best shown in Fig. 3, comprises elements 18, 19, 20 and 21 suitably interconnected, such as by spot welding, in a rigid manner. The whole slide holder and diaphragm assembly is encased by plates 22 and 23, connected by means of bolts 24 and 25, which together constitute a frame for the assembly. Plate 22, which is bent at right angles in five places, as illustrated in Fig. 1, also has a projection 26, which fits in a groove 27 formed internally of the casing 1 to provide bottom support to the assembly. A slide bar 28 which may have the shape of an angle element, as illustrated in the drawings, is inserted in a complementarily shaped groove of the slide holder 16—17. Said slide bar 28 is longer than the double slide holder, so that it protrudes with a portion such as that indicated at 29 in Fig. 2 at one or the other side of the double slide holder. The length of said protruding portion 29, as will be pointed out hereinafter, is determined by the operating requirements of the device. The slide bar 28 is bent at its free end by 90°, such as shown at 30, so that it cannot slide with respect to the slide holder by a distance greater than the length of the portion 29; but must in all motions exceeding such length carry the slide holder with it. The slide bar 28 is also grooved or notched in two places, at 31 and 32, for the purpose which will hereafter be made apparent. A spring 71 is attached to the plate 22, and presses down on the top of the slide holder, as best shown in Fig. 2, to guide it in its sliding motion. Each section of the double slide holder is adapted to receive a slide 33, and has a spring 34 to hold the slide in position. There are two openings 35 and 36 in the slide holder.

In what follows, the diaphragm will be described at first with reference to the positioned relationship of its various component elements, which obtains when a slide is being projected. The diaphragm is then in what will be called hereafter "neutral position."

Mounted on bolt 25, there is a sleeve 37, round which is coiled a torsion spring 38. Freely mounted on the sleeve 37 to the rear thereof, there is a lever plate 39, which lever plate 39 is connected to one end 40 of the torsion spring 38, while the other end 41 of the torsion spring 38 engages a bore in the plate 23, which is stationary. Thus, the torsion spring 38 tends to maintain a lever plate 39 in its neutral position, best seen in Fig. 4. The lever plate 39 is recessed as shown at 42 and this recess engages a pin 43 mounted at the bottom of a lever 44, which will be designated as the "motion transfer lever," for reasons that will become apparent later. Mounted on the lever plate 39, there is a pin 45, which penetrates in one of the recesses 31 or 32 as the case may be, of the slide bar 28. The motion transfer lever 44 is pivoted to the pivot post 46 and carries at its upper end a pin 47. The lever plate 39 has at its upper left hand portion, as viewed in Figs. 2 and 4, an ear 48.

In addition to the pivot post 46, there are three other pivot posts, that is the spring post 49, and the two identical posts 50, which are countersunk as indicated at 51, so that they will not interfere with the free motion of the slide holder. Each post comprises a bolt, and the bolt carries thereon a sleeve, such as the sleeve 52, which is recessed such as at 53 to receive in peripheral engagement an iris ring 54. The four aforementioned posts, with their recessed sleeves, cooperate to maintain the iris ring in position and guide it, while allowing it to rotate in situ about a central point defined by the intersection of a line joining the center of the post 46 to the center of the post 49 with a line joining the centers of the two posts 50. It is to be noted that this central point is also a point of the optical axis of the projector. The iris ring 54 has a central opening 55 alined with the opening 35 or 36, depending on which of the two happens to be in position for the projecting. The iris ring 54 also has therein four recesses 56. On the periphery of the iris ring 54 there is a lug 57 adapted to bear against the recess 53 of the sleeve 52 of the spring post 49, and when it so bears, to prevent any clockwise rotation of the iris ring. The words "clockwise" and "counterclockwise," as well as "right" and "left," are to be construed, wherever they occur, as referring to a view of the device from the front of the projector, as in the drawings. A tension spring 58 is attached to the spring post 49 and to the periphery of the iris ring 54 at 59, and normally urges the iris ring clockwise, thus causing the lug 57 to bear on the post 49, and maintaining, in cooperation with said lug and post, the iris ring in the neutral position of Fig. 4.

Figure 4:
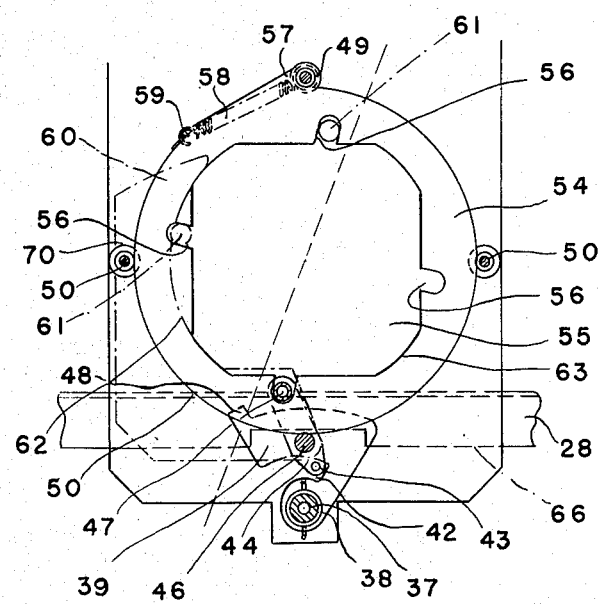
Fig. 4 is a vertical section taken on the line 4—4 of Fig. 3, looking in the direction of the arrows, showing all the elements in their neutral position, by which word "neutral" is meant the position assumed by the elements while a slide is being projected on the screen.
Figure 5:
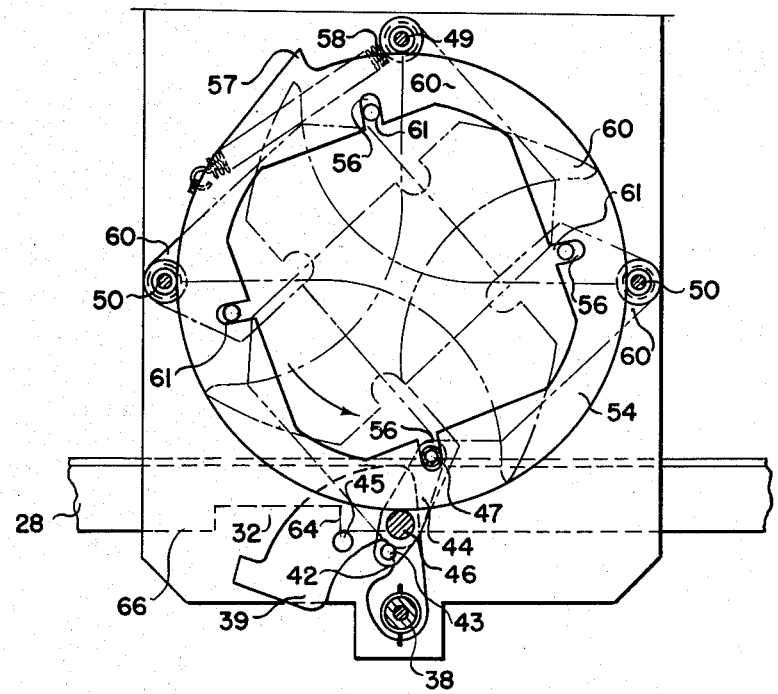
Fig. 5 is a vertical section similar to Fig. 4, but showing all the elements thereof in the position they assume while slides are being changed and the slide holder assembly moves to the left, as viewed from the front of the projector.
Figure 6:
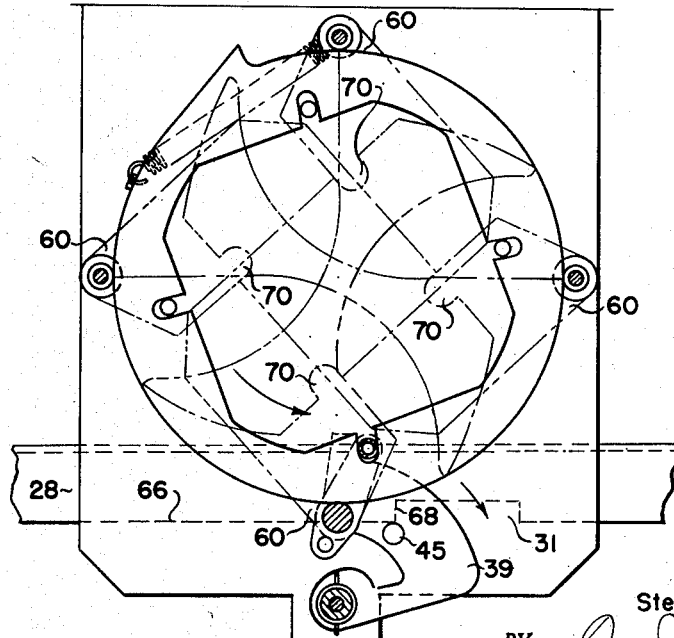
Fig. 6 is a vertical section similar to Figs. 4 and 5 but showing all the elements in the position they assume while slides are being changed and the slide holder assembly moves to the right, as viewed from the front of the projector.

In addition to the elements already described, the diaphragm comprises four iris leaves 60, pivoted one each to the post 46, the post 49 and the two posts 50. One of said leaves only is shown in Fig. 4, for the sake of simplicity, while all four are shown in Figs. 5 and 6 in broken lines, as they are located behind the plane 4—4 along which the sections of Figs. 4, 5 and 6 are taken. The leaf pivoted to the post 46 is rigidly connected through this pivot and also through the pin 47 to the motion transfer lever 44. Each of the remaining iris leaves has mounted thereon a pin 61, analogous in position and function to the pin 47. Each of said pins 61, and also the pin 47, engages one of the recesses 56 of the iris ring 54. Each iris leaf has a recess 70 adapted to accommodate one of the posts 46, 49 and 50, when the leaf is in the neutral position of Fig. 4.

Thoroughly to understand the operation of this device, let us assume that it is initially in the neutral position of Fig. 4, which is the same as the position of Fig. 1, if it is the section 17 of the slide holder that is alined with the iris ring and with the optical axis of the projector. Then said section 17 will house a slide, and said slide is being or can be projected. Obviously, all the elements of the diaphragm being in the position of Fig. 4, the iris leaves are swung outwardly, as clearly indicated in said figure, so that their inner edges 62 substantially coincide with the inner edge 63 of the iris ring, in the portion of said edge 63 which are substantially circular; while in the portions of said edge 63 which are substantially straight, the edges 62 are outwardly of the edge 63. Thus the opening 55 of the iris ring is completely free from obstructions, and light can pass therethrough to the screen.

If now it is desired to change the slide, a new slide will be introduced into the section 16 of the slide holder, which protrudes outwardly of the casing to the right of the projector, as viewed from the front in Fig. 1. Then the right-hand bent end 30 of the slide bar 28 is manually urged to the left. At first, the slide bar slides with respect to the slide holder 16—17 freely, without causing any motion of this latter. No motion of any other parts occurs until the slide bar has moved by a distance equal to one-half the length of the portion 29 of the slide bar 28. At this point the right hand edge 64 of the recess 32 of the slide bar engages the pin 45, and urges it to the left. This causes the lever plate 39 to swing counterclockwise, and as a result the pin 45 not only moves to the left, but also downwardly.

Rotation of the lever plate 39 causes no motion of any other parts until the edge of the recess 42 engages the pin 43. Then the pin 43 is urged to the left, causing the motion transfer lever 44 to swing clockwise, carrying the pin 47 to the right. Concurrently, the torsion spring 38 is deformed against its elastic reaction.

Rightward motion of the pin 47, because of the engagement of said pin with the recess 55 of the iris ring 54, causes said iris ring to rotate counterclockwise. Concurrently, rotation of the motion transfer lever 44 causes the iris leaf 63 connected thereto to swing clockwise about its pivot post 46 and to assume the position shown in Fig. 5. Counterclockwise rotation of the iris ring 44 results in a stretching of the tension spring 58 beyond its normal tension, as the lug 57 becomes spaced to the left from the post 59. Concurrently, each pin 61 of an iris leaf 60, through its engagement with a recess 56 of the iris ring is set in motion, the pin of the top leaf moving to the left, the pin of the left-hand leaf downwardly, and the pin of the right-hand leaf upwardly. As a result each iris leaf is forced to swing clockwise about its pivot 49 or 50 as the case may be, in a manner analogous to the motion of the bottom iris leaf, already described. Thus all the iris leaves go to occupy the position shown in Fig. 5.

These motions are completed by the time the slide bar 28 has moved to the left by a space equal to the complete length of the portion 29 thereof. At this point the pin 45 has swung downwardly so far that its periphery at its uppermost point is no higher than the lower edge 66 of the slide bar, as shown in Fig. 5. Thereafter the slide bar rides over said pin 45, and the various parts of the diaphragm assembly remain in the position of Fig. 5, without further motion. Now, however, the bent end 30 of the slide bar contacts the end 67 of the section 16 of the slide holder. Then any further motion to the left of the slide bar causes an identical motion of the complete slide holder 16—17. As a result thereof, the section 17, carrying the slide which has already been projected, issues to the left from the casing 1, while the section 16, carrying the new slide goes into the projecting or neutral position. The slide bar now protrudes to the right of the slide holder 16—17 by an amount equal to the length of the portion 29. Before the motion of the slide holder has been completed, the edge 68 of the recess 31 of the slide bar reaches the uppermost point of the periphery of the pin 45. Thereafter the recess 31 overlies the pin 45, and said pin is no longer held in its leftward and downward position of Fig. 5. Then the elasticity of the deformed torsion spring 38 comes into play, and swings the lever plate 39 clockwise back to its neutral position. The edge 65 of the recess 42 no longer operates to hold the pin 43 in the position of Fig. 5, and therefore the motion transfer lever 44, the iris rings 54, and the iris leaves 60 are free to return to the neutral position wherein they allow free passage of light to the screen, and they do so return, the motive power for their return motion being furnished by the tension spring 58. Now the projector is once more ready for operation, all of its parts being in a position analogous to that of Fig. 1, except that now the section 16 of the slide holder is centered, while the section 17 protrudes outwardly of the casing 1 to the left, and the slider bar 28 protrudes to the left of the slide holder section 17 by an amount equal to the length of the portion 29.

As soon as it is desired to change slides once more from this new position, after a new slide has been inserted into the section 17 of the slide holder, the slide bar is pushed to the right. The same process already described now takes place once more, except that now the edge 68 of the recess 31 plays the part previously played by the edge 64 of the recess 32. The pin 45 is urged to the right, until it assumes the position of Fig. 6. The lever plate 39 swings clockwise to the position of Fig. 6. As soon as the edge of the lug 48 of the lever plate engages the pin 47, said pin 47 is urged to the right, causing the iris ring 54 and the iris leaves 60 exactly to repeat the motions described above. In due course, the slide bar 28 rides over the pin 45, and the diaphragm stays closed, while the slide holder continues to move to the right. Finally, the edge 64 of the recess 32 reaches the uppermost point of the periphery of the pin 45, accomplishing the function previously performed by the edge 68 of the recess 31, and all the parts of the diaphragm return by spring action, as above described, to their neutral position of Fig. 4. Thus one complete cycle of operation has taken place which cycle can be repeated indefinitely.

A preferred embodiment of this invention has been described, for the purpose of illustrating the same, and of showing how it achieves the objects initially set forth. It is clear, however, that a number of mechanical parts, as well as the particular shapes and arrangement thereof, can be varied, modified and adapted by a person skilled in the art, availing himself of a fair range of equivalent, without departing from the spirit of this invention or exceeding the scope of the claims.

I claim:

1. In a slide projector embodying a source of light, a slide holder embodying two sections for carrying each a slide, said slide holder being reciprocable between two extreme positions in each of which one section of said slide holder is centrally alined with the optical axis of the projector so that the image of a slide carried therein can be projected on a screen while the other section of said slide holder is accessible for changing a slide carried therein, longitudinal slidable means mounted within and movable relative to and with said slide holder for periodically reciprocating said slide holder between said two extreme positions, and diaphragm means operatively associated with and periodically actuatable upon displacement of said means for cutting off the light from the screen whenever said slide holder is shifted away from either one of said extreme positions.

2. In a slide projector embodying a source of light, a slide holder embodying two sections for carrying each a slide, said slide holder being reciprocable between two extreme positions, in each of which one section of said slide holder is centrally alined with the optical axis of the projector so that the image of a slide carried therein can be projected on a screen while the other section of said slide holder is accessible for changing a slide carried therein, diaphragm means for controlling the passage of light from said source to the screen, and a longitudinally slidable and reciprocable member mounted within and movable relative to and with said slide holder operatively associated with said slide holder and said diaphragm means and actuatable upon displacement first to close said diaphragm means and subsequently to move said slide holder from one to the other of said extreme positions thereof, said reciprocable member thereafter acting on said diaphragm means to reopen the same when said slide holder nears one of said extreme positions.

3. In a slide projector, a slide holder, a source of light, a diaphragm interposed between said source of light and a screen, means embodying tension spring elements for urging said diaphragm to an open position, a longitudinally slidable member reciprocable within and movable relative to and with, and periodically actuating said slide holder for displacing the same beyond the axis of said light, said member having a limited lost motion with respect to said slide holder prior to actuating this latter, and motion transfer means operatively connected with said member and actuated by said member during the movement providing said lost motion thereof relative to said slide holder to close said diaphragm.

4. In a slide projector, a source of light, a slide holder, embodying two sections for carrying each one slide, said slide holder being normally in one of two extreme positions in each of which one section of said slide holder is centrally alined with the optical axis of the projector so that the image of a slide carried therein can be projected on a screen while the other section of said slide holder is accessible for changing a slide carried therein, said slide holder being longitudinally reciprocable between said two extreme positions, a diaphragm interposed between said source of light and the screen, means embodying tension spring elements for normally maintaining said diaphragm in an open position, a member slidable within and movable relative to and with, and periodically actuating said slide holder between said two extreme positions, said member having a limited lost motion with respect to said slide holder prior to actuating the same periodically actuatable, motion transfer means operatively connected to said member and said diaphragm, means embodying tension elements for normally maintaining said motion transfer means in a neutral position, said motion transfer means when they depart from said neutral position causing said diaphragm to close, said member during the movement providing said lost motion thereof actuating said motion transfer means to depart from said neutral position thereof and allowing the same to return to said neutral position when said slide holder nears one of said extreme positions thereof.

5. In a slide projector embodying a source of light, a slide holder embodying two sections for carrying each a slide, said slide holder being reciprocable between two extreme positions, in each of which one section of said slide holder is centrally alined with the optical axis of the projector so that the image of a slide carried therein can be projected on a screen while the other section of said slide holder is accessible for changing a slide carried therein, a number of iris leaves swingable in synchronism between an open and a closed position to control the passage of light to the screen, and a movable member mounted within and longitudinally reciprocable relative to and with said slide holder operatively associated with said slide holder and said iris leaves, said movable member, when actuated, operating first to cause said iris leaves to assume said closed position thereof and subsequently, to move said slide holder from one to the other of said extreme positions thereof, said movable member allowing said iris leaves to return to said open position thereof, when said slide holder nears an extreme position.

6. In a slide projector, a slide holder, a number of iris leaves swingable in synchronism between an open and a closed position, a member operatively connected to said iris leaves and having a neutral position wherein said iris leaves are open and a displaced position wherein said iris leaves are closed, tension spring means for urging said member to the neutral position thereof, and means mounted within and longitudinally reciprocable relative to and with said slide holder for causing said member to assume said displaced position and for moving said slide holder to make it possible to change slides.

7. In a slide projector, a slide holder, a number of iris leaves swingable in synchronism between an open and closed position, a member operatively connected to said iris leaves, said member having a neutral position wherein said iris leaves are open and being rotatable to a displaced position wherein said iris leaves are closed, tension spring means for urging said member to the neutral position thereof, lever means operatively connected to said member, said lever means having a neutral position corresponding to the neutral position of said member and being swingable from said neutral position to overcome said tension spring means and cause said member to assume the displaced position thereof, tension spring means urging said lever means to their neutral position, and means mounted within and longitudinally reciprocable relative to and with said slide holder for swinging said lever means from their neutral position and for moving said slide holder to make it possible to change slides.

8. In a slide projector, a slide holder, a number of iris leaves swingable in synchronism between an open and a closed position, a member operatively connected to said iris leaves and having a neutral position wherein said iris leaves are open and a displaced position wherein said iris leaves are closed, tension spring means for urging said member to the neutral position thereof, and a reciprocable member mounted within and longitudinally reciprocable relative to and with said slide holder operatively associated with said slide holder and said member, said reciprocable member operating during a first part of its stroke to move said member to the displaced position thereof, and during a subsequent part of its stroke to move said slide holder to make it possible to change slides and to allow said tension spring means to return said member to its neutral position.

9. In a slide projector, a slide holder, a number of iris leaves swingable in synchronism between an open and closed position, a member operatively connected to said iris leaves, said member having a neutral position wherein said iris leaves are open and being rotatable to a displaced position wherein said iris leaves are closed, tension spring means for urging said member to the neutral position thereof, lever means operatively connected to said member, said lever means having a neutral position corresponding to the neutral position of said member and being swingable from said neutral position to overcome said tension spring means and cause said member to assume the displaced position thereof, tension spring means urging said lever means to their neutral position, and a reciprocable member mounted within and longitudinally reciprocable relative to and with said slide holder operatively associated with said slide holder and said lever means, said reciprocable member operating during a first part of its stroke to swing said lever means from their neutral position, and during a subsequent part of its stroke to move said slide holder to make it possible to change slides and to allow said second mentioned resilient means to return said lever means to their neutral position.

10. In a slide projector, a frame, a slide holder having two operative positions in each of which a slide is in position for projecting and another slide is accessible for changing; a diaphragm, means for normally holding said diaphragm open, a lever pivoted in said frame, a pin rigid with said lever, tensionable means for normally urging said lever to a neutral position means for closing said diaphragm whenever said lever is displaced by a predetermined amount from its neutral position, a slidable member mounted within and reciprocable relative to and with said slide holder and actuable to undergo a limited free displacement with respect to said slide holder when this latter is in one operative position and actuable to undergo further displacement with respect to said frame together with said slide holder while this latter is shifted to its other operative position, two recesses in said slidable member, one of said recesses receiving said pin when said slide holder is in an operative position, whereby when said slidable member undergoes said free displacement a shoulder of said recess receiving said pin acts thereon to cause said lever to be displaced by predetermined amount corresponding to the closing of said diaphragm, said slidable member preventing the return of said pin and said lever to the neutral position thereof while said slidable member undergoes said further displacement until the other recess of said slidable member receives said pin and allows said resilient means to return said lever to its neutral position.

11. In a slide projector, in combination with a frame, a slide holder having two operative positions in each of which a slide is in position for projecting and another slide is accessible for changing, and a diaphragm; tension spring means for holding said diaphragm open when said slide holder is in an operative position, and means for closing said diaphragm when said slide holder is to be shifted away from an operative position; said means embodying a reciprocable member mounted within and longitudinally movable with and relative to said slide holder, a first lever pivoted in said frame, tension spring means for normally holding said first lever in a neutral position, means for swinging said first lever from its neutral position when said reciprocable member is actuated, a second lever pivoted in said frame, means for swinging said second lever when first lever is swung from its neutral position, and means for operatively connecting said second lever to said diaphragm, whereby the swinging of said second lever causes said diaphragm to close.

12. In a slide projector, a frame, a slide holder embodying two sections for carrying each a slide, said slide holder being reciprocable between a first and second extreme position in each of which one section of said slide holder is centrally alined with the optical axis of the projector while the other section is accessible for changing a slide carried therein; a reciprocable member mounted within and slidable by a limited distance relative to said slide holder and further slidable therewith with respect to said frame; a diaphragm embodying a number of iris leaves swingable in synchronism between an open and a closed position, a rotatable ring, pin and recess means operatively connecting said ring and iris leaves, tensionable means normally holding said ring in a neutral position, means for preventing rotation of said ring in one direction, a rotation of said ring in the permissible direction causing said iris leaves to assume their closed positions; a first lever pivoted in said frame and having a recess and a lug; tensionable means for urging said first lever to a neutral position; a pin rigid with said lever and engaging a first and a second recess in said reciprocable member respectively when said slide holder is in its first and second extreme positions; a second lever having a pivot in said frame, a first pin engaged by said recess of said first lever when this latter is displaced in one direction from its neutral position, and a second pin engaged by said lug of said first lever when this latter is displaced in the other direction from its neutral position, said first and second pin being on opposite sides of said pivot, said second pin also engaging at all times a recess in said ring; whereby when said slide holder is in its first extreme position and said reciprocable member slides with respect thereto, said first lever is caused to swing until the pin thereof goes out of engagement with said first recess of said reciprocable member, said recess of said first lever engages said first pin of said second lever causing this latter to swing, said second pin of said second lever causes said ring to rotate in said permissible direction, said ring causes said iris leaves to assume their closed position, and all the aforementioned elements remain in the position they have thus assumed while said slide holder moves to its second extreme position until said second recess of said reciprocable member reaches a position wherein it is engaged by said pin of said first lever, said second mentioned tensionable means return said first lever to its neutral position, said first mentioned resilient means return said ring to its neutral position, and said iris leaves are caused thereby to return to their closed position; and whereby when said slide holder is in its second extreme position and said reciprocable member initially slides with respect thereto, said first lever is caused to swing until the pin thereof goes out of engagement with said second recess of said reciprocable member, said lug of said first lever engages said second pin of said second lever causing this latter to swing and said ring to rotate in said permissible direction, said ring causes said iris leaves to assume their closed position, and all the aforementioned elements remain in the position they have thus assumed while said slide holder moves to its first extreme position until said first recess of said reciprocable member reaches a position wherein it is engaged by said pin of said first lever, said second mentioned tensionable means return said first lever to its neutral position, said first mentioned tensionable means return said ring to its neutral position, and said iris leaves are caused thereby to return to their open position.

STEN JOHANSON.

REFERENCES CITED

The following references are of record in the file of this patent:

UNITED STATES PATENTS

| Number | Name | Date |
|---|---|---|
| 448,825 | Shannon | Mar. 24, 1891 |
| 482,238 | Force | Sept. 6, 1892 |
| 564,177 | Hastings et al. | July 14, 1896 |
| 952,346 | Oldfield et al. | Mar. 15, 1910 |
| 1,172,628 | Partington | Feb. 22, 1916 |
| 1,257,986 | England | Mar. 5, 1918 |

FOREIGN PATENTS

| Number | Country | Date |
|---|---|---|
| 14,634 | Great Britain | of 1891 |